United States Patent
Kodama et al.

(10) Patent No.: US 7,767,314 B2
(45) Date of Patent: Aug. 3, 2010

(54) WELD JOINT FORMED WITH STAINLESS STEEL-BASED WELD METAL FOR WELDING A ZINC-BASED ALLOY COATED STEEL SHEET

(75) Inventors: Shinji Kodama, Chiba (JP); Hideki Hamatani, Chiba (JP); Nobuo Mizuhashi, Chiba (JP); Kenichi Asai, Tokyo (JP); Manabu Mizumoto, Chiba (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 11/992,200

(22) PCT Filed: Sep. 25, 2006

(86) PCT No.: PCT/JP2006/319613
§ 371 (c)(1), (2), (4) Date: Mar. 18, 2008

(87) PCT Pub. No.: WO2007/037447
PCT Pub. Date: Apr. 5, 2007

(65) Prior Publication Data
US 2009/0158889 A1    Jun. 25, 2009

(30) Foreign Application Priority Data
Sep. 28, 2005 (JP) .............................. 2005-282712
May 16, 2006 (JP) .............................. 2006-136897

(51) Int. Cl.
B32B 15/00 (2006.01)
B32B 15/01 (2006.01)
B32B 15/02 (2006.01)
B32B 15/18 (2006.01)

(52) U.S. Cl. ................ 428/659; 428/615; 428/655; 428/657; 428/658

(58) Field of Classification Search ............ 219/146.23; 420/519; 75/302; *B23K 35/30; C22C 18/00, C22C 02/06, 38/00*
See application file for complete search history.

(56) References Cited

FOREIGN PATENT DOCUMENTS

DE    2 154 048 A1    5/1973

(Continued)

OTHER PUBLICATIONS

Russian Office Action dated Jun. 19, 2009 for corresponding Russian Application No. 2008116610/02, 7 pgs.

*Primary Examiner*—Jerry Lorengo
*Assistant Examiner*—Jared Wood
(74) *Attorney, Agent, or Firm*—Birch, Stewart, Kolasch & Birch, LLP (57) ABSTRACT

Disclosed are a weld joint and a stainless steel-based weld metal composition for the weld joint. The composition and weld joint made therefrom are suitable for welding a zinc-based alloy coated steel sheet. The weld is excellent in corrosion resistance and liquid-metal embrittlement crack resistance. This is accomplished by inhibiting liquid-metal embrittlement cracks of the stainless-steel-based weld metal when the zinc-based alloy coating steel sheet is welded using the stainless-steel-based weld metal. The weld joint comprises a welded portion of weld metal made of stainless-steel-based components, the weld metal containing in mass percent (%): C: 0.01-0.1; Si: 0.1-1; Mn: 0.5-2.5; Ni: 5-11; and Cr: 17-25, and the balance being iron and residual impurities, wherein the following expression are met: $-0.81 \times Cr$ equivalent$+23.2 \leq Ni$ equivalent$\leq 0.95 \times Cr$ equivalent$-8.1$ ... (1); Ni equivalent$=Ni+30 \times C+0.5 \times Mn+30 \times N$ ... (2); Cr equivalent$=Cr+Mo+1.5 \times Si$ ... (3).

4 Claims, 2 Drawing Sheets

FOREIGN PATENT DOCUMENTS

| | | | |
|---|---|---|---|
| DE | 2 255 673 A1 | 5/1974 |
| DE | 26 44 039 B1 * | 1/1978 |
| DE | 26 44 039 B1 | 1/1978 |
| EP | 0 867 256 A1 | 9/1998 |
| GB | 1 293 696 A | 10/1972 |
| JP | 09-267177 * | 10/1977 |
| JP | 60-148693 A | 8/1985 |
| JP | 3-264194 A | 11/1991 |
| JP | 7-88684 A | 4/1995 |
| JP | 09-267177 A | 10/1997 |
| JP | 11-256234 A | 9/1999 |
| JP | 2000-64061 A | 2/2000 |
| JP | 2001-009589 A | 1/2001 |
| JP | 2006-35293 A | 2/2006 |
| RU | 2243071 C2 | 12/2004 |

* cited by examiner

WELD JOINT FORMED WITH STAINLESS STEEL-BASED WELD METAL FOR WELDING A ZINC-BASED ALLOY COATED STEEL SHEET

This application claims priority to Japanese Application Nos. JP 2005-282712, and JP 2006-136897, filed in Japan on Sep. 28, 2005, and May 16, 2006, respectively. The entire contents of these applications are herein incorporated by reference.

FIELD OF THE INVENTION

One aspect of the present invention relates to a weld joint for zinc-based alloy coated steel sheets. This weld joint is formed with a stainless steel-based weld metal and may be used in building materials or automobile materials. The weld joint is excellent in corrosion resistance and liquid-metal embrittlement (LME) crack resistance at the welded portion.

BACKGROUND OF THE INVENTION

Zinc-based alloy coated steel sheets are widely used as building materials and automobile materials because of their good corrosion resistance as structural members. Conventionally, in order to improve the corrosion resistance after non-coated members are welded, the welded members are dipped in a zinc-based alloy bath. This applies the zinc-based alloy to the steel member and the surface of the welded portion, which secures corrosion resistance to the whole welded structure. This method, however, provides low productivity since coating has to be conducted after the welding process. This causes an increase in manufacturing costs since additional facilities, such as a coating bath, are required. In view of this, to manufacture a structural member with good corrosion resistance and with high productivity, a method where zinc-coated steel sheets are welded to form the welded structure has been employed.

JP2000-64061 discloses a zinc-base alloy coated steel sheet in which a zinc-based alloy, such as a Zn—Al—Mg—Si based alloy, is coated. The Zn—Al—Mg—Si based alloy coating has improved corrosion resistance compared to conventional zinc-coated steel sheets.

In the case of manufacturing a structure by welding a zinc-based alloy coated steel sheet, however, corrosion resistance is deteriorated because the coated part of the welded metal portion is evaporated. In view of this, conventionally zinc-based alloy coated steel sheets are first welded using a carbon steel welding material and then the welded portion is coating by brushing or spraying. This additional coating process lowers productivity in the manufacturing of the structural member.

As for welding of stainless steel structures where good corrosion resistance is required, a stainless steel welding material is used to form a welded metal with good corrosion resistance at the joint between stainless steels or stainless steel and carbon steel. However, if a stainless steel welding material is used for welding zinc-base alloy coated steel sheets, cracks occur due to liquid-metal embrittlement. This is because when the zinc-base alloy coated steel is welded, liquid-metal embrittlement cracks form at the welded portion of the stainless steel components due to the melted coating.

The a main cause for liquid-metal embrittlement cracks is thought to be that zinc-based alloy coating components remain melted on the steel sheet. This can break at the crystal grain boundary when the welded metal portion is subjected to tensile stress caused by heat contraction. This is the cause of the brittleness. Therefore, it has been common sense that the zinc-based coating must has be removed in advance when the zinc-coated steel sheets are welded using a stainless steel welding material.

A phenomenon similar to liquid-metal brittleness cracks occurs when different materials, such as a stainless steel sheet and a zinc coated steel sheet, are welded. Therefore, there have been few attempts at welding zinc-coated steel sheets or at welding zinc-coated and stainless steels using a stainless steel-based welding material.

JP09-267177A discloses a manufacturing method of a steel door with good corrosion resistance. In this method, a stainless steel sheet and a zinc-coated steel sheet, both of which are about 2 mm thick, are butt-welded using filler wire with a relatively high Ni content. The Ni content is such to keep the Ni equivalent of the weld metal of stainless steel-based components higher than a predetermined value in order to disperse austenite and inhibit the formation of martensite of poor ductility. This leads to prevention of cracks caused by bending after welding.

In the disclosure of JP09-267177A, there is no description of liquid-metal brittleness cracks (zinc brittleness cracks) that usually occur immediately after the stainless steel-sheet and the zinc-coated steel sheet are butt-welded. In the disclosure of JP09-267177A, a hot-dip zinc-coated steel sheet, of which the melting point of the zinc coating is high, is welded on the condition that the thickness of the steel sheet is 2 mm, and the binding force at the welded portion is weak. This seems to be the reason that liquid-metal embrittlement cracks (zinc brittle cracks) do not occur when the stainless steel sheet and the zinc-coated steel sheet are butt-welded.

However, if a zinc-based alloy coated steel sheet without alloying treatment is butt-welded using the method described in JP09-267177A on the condition that the thickness of the sheet is 3 mm or more and the binding force of the welded portion is high as in a fillet weld, it is supposed to have a phenomenon similar to liquid-metal embrittlement cracks.

The reason why the phenomenon similar to liquid-metal embrittlement cracks occurs easier when the thickness of the sheet to be welded is 3 mm or more and the binding force is higher, is that as the thickness of the sheet increases and/or the binding force increases, the tensile stress, caused by heat contraction of the weld metal, also increases. This causes the zinc-based alloy coating components that remain melted on the surface to break easily at the crystal grain boundary of the weld metal.

When stainless steel sheets are butt-welded, delayed cracks may occur after welding. JP2001-9589A disclosed a method for preventing delayed cracks after welding when a high Cr content stainless steel is welded.

In view of above, it is understood that a method for manufacturing a welded structure, having excellent corrosion resistance in the welded portion, is very difficult when a zinc-based alloy coated steel sheet is welded using a stainless steel-based welding material.

SUMMARY OF THE INVENTION

An object of the invention is to provide a weld joint formed using a stainless steel-based welding material. This stainless steel-based welding material is particularly suited for welding a zinc-based alloy coated steel sheet and results in excellent corrosion resistance and liquid-metal embrittlement crack resistance at the welded portion. This is accomplished by inhibiting liquid-metal embrittlement cracks of the stainless-steel-based weld metal when a zinc-based alloy coated steel sheet is welded.

The inventors have diligently researched improvement of corrosion resistance of welded portions by using a stainless steel-based welding material for welding zinc-based alloy coated steel sheets. The inventors have also diligently researched improvement in the inhibition of liquid-metal embrittlement cracks caused by welding stainless steel metal-based components and zinc-based alloy coatings.

As a result of this research, it is found that the occurrence of liquid-metal embrittlement cracks of stainless steel-based weld metals depend on solidification mechanisms and structure. Liquid-metal embrittlement cracks can be inhibited by adjusting component compositions based on Ni equivalent and Cr equivalent in order to inhibit martensite formation in the weld metal and to accelerate ferrite formation.

The present invention is made based on the knowledge obtained above and the gist of invention is described below.

One aspect of the present invention relates to a stainless steel-based welding material composition and a weld joint made therefrom. The weld joint is for a zinc-based alloy coated steel sheet excellent in corrosion resistance and liquid-metal embrittlement crack resistance in the welded portion. The weld joint comprises a welded portion of weld metal made of stainless steel-based components, the weld metal comprising in mass percent (%):

C: 0.01-0.1;
Si: 0.1-1
Mn: 0.5-2.5;
Ni: 5-11; and
Cr: 17-25, and the balance being iron and residual impurities, wherein the following expressions (1), (2) and (3) are met;

$$-0.81 \times Cr\ equivalent + 23.2 \leq Ni\ equivalent \leq 0.95 \times Cr\ equivalent - 8.1 \quad (1)$$

$$Ni\ equivalent = Ni + 30 \times C + 0.5 \times Mn + 30 \times N \quad (2)$$

$$Cr\ equivalent = Cr + Mo + 1.5 \times Si \quad (3),$$

wherein each of Ni, C, Mn, N, Cr, Mo and Si represents content (mass %) of each component element contained in the stainless steel-based weld metal.

In another aspect of the present invention, the stainless steel-based weld metal described above further-comprises in mass (%):

Mo: 0.5-2; and
N: 0.05-0.15.

In another aspect of the present invention, the composition of the stainless steel-based weld metal is adjusted by a solid wire or a flux-cored wire, wherein the solid wire or the flux-cored wire comprises the following metal components in mass (%) per total wire mass:

C: 0.01-0.05;
Si: 0.1-1;
Mn: 0.5-3:
Ni: 7-12;
Cr: 24-30, and
at least one of Mo: not greater 2 or N: 0.17, and the balance being-iron and residual impurities.

In yet another aspect of the present invention, the flux-cored wire contains the followings as slag components in mass (%) per total wire mass:

TiO$_2$: 0.5-2.5;
SiO$_2$: 1.5-3.5; and
ZrO$_2$: 0.5-2.5, wherein total amount of the slag components ranges from 6.5 to 9.5.

In another aspect of the present invention, the zinc-based alloy coating comprises the following in mass (%), with the balance being zinc and residual impurities:

Al: 2-19;
Mg: 1-10; and
Si: 0.01-2.

In yet another aspect of the present invention, in the case of welding zinc-based alloy coated steel sheets using stainless steel-based welding materials, it is possible to inhibit liquid-metal embrittlement cracks of the weld metal of stainless-steel-based components. This provides a weld joint excellent in corrosion resistance having a welded metal without crack defects. Therefore, decay durability and/or safety of a building and/or an automobile can be improved by applying the present weld joint for zinc-based alloy coated steel sheets to the welded member in the building and/or automobile industries.

DETAILED DESCRIPTION OF THE INVENTION

The details of the present invention are described below.

According to conventional knowledge, if a zinc-based alloy coated steel sheet is welded using stainless steel-based welding wire, the sensitivity of brittleness cracks increases since the weld metal has a stainless steel-based component composition. Therefore, it is expected that liquid-metal embrittlement cracks of the weld metal caused by hot-dip zinc-based alloy coating becomes remarkable. Consequently, arc-welding of zinc-based alloy coating steel sheets using stainless-steel-based welding wire has not been attempted.

The inventors have diligently researched improvement of corrosion resistance of welded portions by using stainless steel-based welding material for welding zinc-based alloy coated steel sheets. The inventors have also diligently researched the inhibition of liquid-metal embrittlement cracks caused by the welding of metal of stainless steel-based components and zinc-based alloy coatings. As a result of this research, it is found that the occurrence of liquid-metal embrittlement cracks of the weld metal of stainless-steel-based components depends on solidification morphology and structure. Adjusting the component composition based on Ni equivalent and Cr equivalent can inhibit liquid-metal embrittlement cracks. This inhibits martensite formation in the weld metal and accelerates ferrite formation.

"Zinc-based alloy coated steel sheet" is a generic term including zinc coated steel sheets and other coated steel sheets, such as Zn—Al-based alloy coated sheets, Zn—Al—Mg-based alloy coated sheets and Zn—Al—Mg—Si-based alloy coated sheets, which are made by adding Al, Mg, Si to zinc coatings in order to improve the corrosion resistance.

In order to investigate the cause of liquid-metal embrittlement cracks in a weld metal of stainless steel-based components, the inventors carried out the welding of zinc-based alloy coating steel sheets using stainless steel-based wires of different component compositions. The inventors studied the relationship between the composition of components of welded material formed on the welded portion and the configuration of liquid-metal embrittlement cracks.

Figure 1:
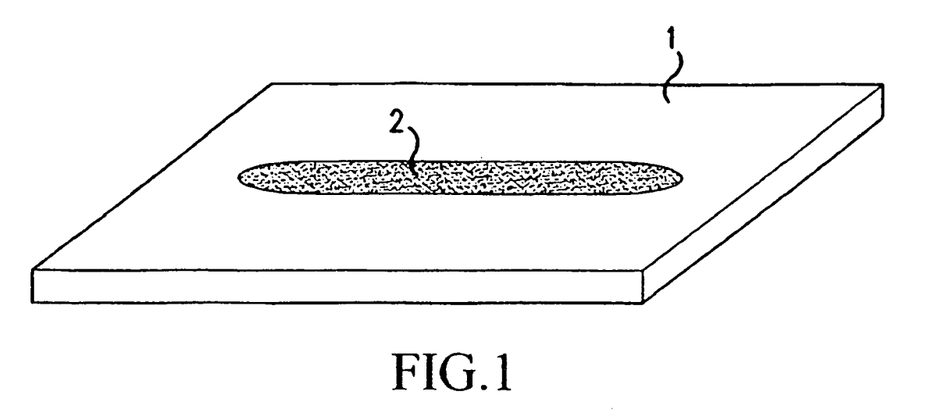
FIG. 1 is an illustration of an example of a bead-on-plate welding test piece.

According to the present invention, a stainless steel-based welding material comprises: C: 0.04%, Si: 0.2%, Mn: 2.1%, Ni: 5-12%, Cr: 16-36%, Mo: 0-3%. A zinc-based alloy coating steel sheet comprises a SS400 base steel sheet (6 mm thick) containing C: 0.08%, Si: 0.02%, Mn: 1.2%, with an alloy coating of Zn: 85.8%; Al: 3%; Mg: 0.2%: Si thereon. For welding here is used carbon dioxide gas arc-welding, a welding current of 100-150 A, an arc voltage of 18-20V, and a welding speed of 40 cm/min bead on plate as shown in FIG. 1

Bead-on-plate welding refers to the placing of a welding bead 2 on the surface of a steel sheet 1, which is the most basic method of evaluation of weldability without using a real joint. As for usual weld joints, the binding force working on the welded portion depends on the shape of the joint. For example, compared to a butt-welding joint performed at full penetration, a fillet-welding joint performed at partial penetration has a higher binding force in the area surrounding the welded portion (non-melted part of the base sheet). Therefore, it is thought that cracks occur more easily in Fillet welding. To evaluate cracks in conditions closer to a high binding force fillet-welding, a relatively thick (6 mm) base sheet (plate) is used for bead-on-plate welding. This is because a thick sheet provides a higher binding force due to the binding stress generated in the base sheet responding to heat contraction in the direction along the welding line.

Figure 2:
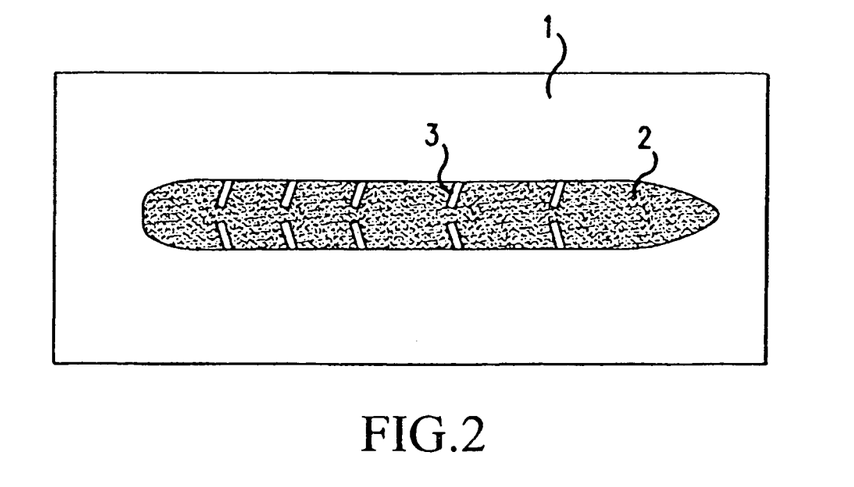
FIG. 2 is an illustration of the configuration of a liquid-metal embrittlement crack.

FIG. 2 its an illustration of the configuration of a liquid-metal embrittlement crack.

As shown in FIG. 2, a liquid-metal embrittlement crack 3 of the welding bead 2 formed on the surface of the steel sheet 1 runs from the edge of the welding bead line in a direction almost perpendicular to the welding bead line. There are generally two directional heat contractions caused after welding, i.e., contraction in the direction along the welding line (longitudinal contraction) and contraction in the direction perpendicular to the welding line (transverse contraction). As for liquid-metal embrittlement cracks in the welded material of stainless-steel-based components, the crack seems to be caused as a result of longitudinal contraction and the binding force against the contraction from the area surrounding the welded portion (non-melted part of base sheet).

Evaluation of weldability is also checked using a commercially available 309 type weld metal. In this evaluation, a sample of zinc-based alloy coated steel sheet has a crack and a sample of removed coating does not have a crack. In view of this, the evaluation is a proper one for the evaluation of liquid-metal embrittlement cracks.

Figure 3:
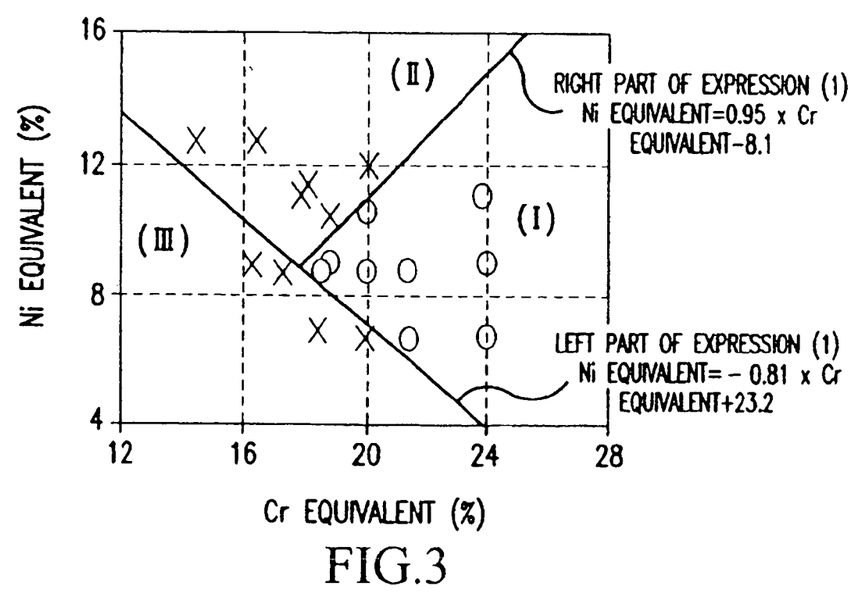
FIG. 3 is a graph showing an evaluation of liquid-metal embrittlement cracks based on Cr equivalent and Ni equivalent using a bead-on-plate welding test.

FIG. 3 is a graph showing an evaluation of liquid-metal embrittlement cracks based on Cr equivalent and Ni equivalent using a bead-on-plate welding test.

A liquid-metal embrittlement crack of weld metal is confirmed using a color-check method (liquid penetrant inspection method). X represents the case where a crack is visible on the welded material, and O represents the case where a crack is not visible on the welded material.

As for alloy elements controlling the structure of the stainless steel-based weld metal, generally there are two groups, i.e., elements for forming the ferrite phase, such as Cr, Si, and Mo; and elements for forming the austenite phase, such as Ni, C, N and Mn.

Considering the contributing rate of each element for forming the ferrite phase or austenite phase, a Ni equivalent defined by the following expression (2) and a Cr equivalent defined by the following expression (3), are calculated. Using the equivalents data as an index, and based on Delong equilibrium diagram, the relation between the Ni equivalent and the Cr equivalent of the welded metal and the structure of welded metal are studied, as well as the relation between the Ni equivalent and the Cr equivalent and liquid-metal embrittlement cracks.

In the case of Ni equivalent$\leq -0.81 \times$Cr equivalent+23.2 (region III in FIG. 3: low Ni equivalent, low Cr equivalent), a lot of martensite is formed in the weld metal, the hardness is increased, and the ductility is decreased. This leads to cracks in the weld metal.

In the case of Ni equivalent$>0.95 \times$Cr equivalent$-8.1$ (region II in FIG. 3: high Ni equivalent, low Cr equivalent), martensite formation is inhibited, and the ductility of welded metal is maintained. However, the ferrite amount in the welded metal is reduced because of the low Cr equivalent, and yet because of the high Ni equivalent, austenite grains grow up to form a lot of coarse austenite. Therefore, the melted zinc coating easily breaks at the coarse austenite grain boundary to form liquid-metal embrittlement cracks.

According to JP09-267177A, region II in FIG. 3 is supposed to be the region to avoid cracks in the welded portion normally formed when a butt-weld joint of a stainless steel and coated steel is subjected to bending. However, the inventors' evaluation of a sample piece which is made by welding a zinc-based alloy coated steel sheet using stainless-steel-based welding wire shows that liquid-metal brittleness cracks occurred in the stainless-steel-based weld metal. This fact suggests that the mechanism of cracking due to bending of a butt-welded joint of a stainless steel and a coated steel disclosed in JP09-267177A is different from liquid-metal embrittlement cracking of a stainless-steel-based weld metal, which is the subject matter of the present invention. Meanwhile, in the case where the Ni equivalent meets the expression (1) below, (i.e., region I in FIG. 3: high Cr equivalent, medium Ni equivalent) formation of martensite in the weld metal is inhibited, the ductility of the weld metal is maintained, and the ferrite phase is formed in 15% or more. Thus, the melted zinc coating is prevented from breaking into the welded metal; which leads to inhibition of liquid-metal embrittlement cracks.

$$-0.81 \times \text{Cr equivalent} + 23.2 \leq \text{Ni equivalent} \leq 0.95 \times \text{Cr equivalent} - 8.1 \quad (1)$$

$$\text{Ni equivalent} = \text{Ni} + 30 \times \text{C} + 0.5 \times \text{Mn} + 30 \times \text{N} \quad (2)$$

$$\text{Cr equivalent} = \text{Cr} + \text{Mo} + 1.5 \times \text{Si} \quad (3),$$

wherein, each of Ni; C, Mn, N. Cr, Mo and Si represents the content (mass %) of each component element contained in the stainless steel-based weld metal.

As shown above, the present invention prevents weld metal of stainless-steel-based components from forming liquid-metal embrittlement cracks with respect to a weld joint for a zinc-based alloy coated steel sheet having a welded portion made of a weld metal of stainless steel-based components. In the present invention, liquid-metal embrittlement cracks of the welded metal can be avoided by preparing a weld metal satisfying the expression (1) above and through selecting the appropriate combination of zinc-based alloy coated steel sheet, welding wire and welding flux, depending on the welding method.

In the present invention, the component composition of the weld metal is defined as follows. This is done in order to form a weld metal with better quality through securing strength of the weld metal, restraining brittleness, and inhibiting welding defects, such as hot cracking and blowholes. This is in addition to securely avoiding liquid-metal embrittlement cracks of the welded material by satisfying expression (1) above.

The percentage % used herein means mass % unless otherwise defined.

Carbon (C) is an element for stabilizing the austenite phase of the weld metal. It is preferable to contain C in an amount of 0.01% or more to take advantage of this function. However, if the content of C exceeds 0.1%, it may cause hot cracks and lower the ferrite phase content, which may cause liquid-metal embrittlement cracks.

Silicon (Si) is an element for forming the ferrite phase and working as an antioxidant with the weld metal. It is preferable to contain Si in an amount of 0.1% or more in the weld metal to take advantage of this function. However, if the content of Si exceeds 1%, it may cause intermetallic compounds in the weld metal and thus deteriorate the toughness. Therefore, the tipper limit of the Si content is preferably 1%.

Manganese (Mn) is an element that functions as an antioxidant with the weld metal and makes sulfur (S) harmless by merging thereto. Sulfur is an unavoidable impurity that can be harmful and cause hot cracking. It is preferable to contain Mn in an amount of 0.5% or more in the weld metal to take advantage of this function. However, if the content of Mn exceeds 2.5%, it may reduce the ferrite phase content, which may lead to liquid-metal embrittlement cracks. Therefore, the upper limit of the Mn content is preferably 2.5%.

Nickel (Ni) is an important element for securing corrosion resistance of the weld metal, for stabilizing the austenite phase of the weld metal, and for adjusting the balance between the austenite phase and the ferrite phase. This maintains the toughness of the weld metal. It is preferable to contain Ni in an amount of 5% or more in the weld metal to take advantage of these functions. However, if the content of Ni exceeds 11%, it reduces the ferrite phase content, which leads to liquid-metal embrittlement cracks. Therefore, the upper limit of the Ni content is preferably 11%.

Chromium (Cr) is an element for securing corrosion resistance of the weld metal and for forming the ferrite phase to avoid liquid-metal embrittlement cracks. In terms of securing corrosion resistance, a Cr content of 13% or more is sufficient, but 17% or more is preferable for avoiding liquid-metal embrittlement cracks. However, it the Cr content exceeds 25%, it may cause intermetallic compounds in the weld metal and thus deteriorate the toughness.

Furthermore, to improve corrosion resistance of the weld metal, molybdenum (Mo) and/or Nitrogen (N) may be added in addition to the above basic components.

Molybdenum (Mo) is an element for forming the ferrite phase and for securing corrosion resistance under chloride environment by using with Cr. It is preferable to contain Mo in an amount of 0.2% or more in the weld metal to take advantage of the function above. However, an excess amount of Mo increases the strength of the weld metal and may cause liquid-metal embrittlement cracks. For example, if the Mo content in the weld metal exceeds 2%, liquid-metal embrittlement cracks may be formed. Therefore, the upper limit of the Mo content is preferably 2%.

Nitrogen (N) is an element inevitably taken in from the atmosphere in an amount of 0.01-0.03% and is also capable of stabilizing the austenite to improve corrosion resistance. It is preferable to contain N in an amount of 0.05% or more in the weld metal to take advantage of the function above. However, an excess amount of N lowers the ferrite content to cause liquid-metal embrittlement cracks. For example, if the N content in the weld metal exceeds 0.15%, liquid-metal embrittlement cracks may be formed. Therefore, the upper limit of the N content is preferably 0.15%.

Although the elements described above are the principal components to be contained in a weld metal of the present invention, needless to say, other elements can be contained in the weld-metal unless the desired properties of the present weld metal are disturbed thereby.

For example, minute amounts of Nb, V, Ti and/or Al can be added to secure the strength of base material of the zinc-based alloy coated steel sheet. These components can be mixed into the weld metal during. The upper limit of each of these elements is preferably 0.1% to avoid the formation of intermetallic compounds in the weld metal, which would deteriorate the toughness.

As a basic material for zinc-based alloy coated steel sheet, a structural steel of low alloy steel may be used. Adjusting of components of weld metal is preferably made to include Ni, C, Mn, N, Cr, Mo, and Si as alloy components, so that the balance can be iron and unavoidable impurities. Considering a dilution ratio of basic material, by melted basic materials of the steel sheet due to welding, of 10-40%, it is preferable to prepare the components of the welding material so that the Ni equivalent and the Cr equivalent can be set higher.

As for stainless-steel-based welding wire, both solid wire and flux-cored wire can be used.

Solid wire is composed entirely of stainless steel wire. Flux-cored wire contains metal powder for adjusting the alloy components and slag material for stabilizing the arc inside the outer shell of the stainless steel wire.

The flux-cored wire is capable of not only controlling the structure and property of the weld metal as well as solid wire, but due to the slag material is also able to improve welding-operability and provide a good welding bead shape and appearance. Also flux forms solidified slag upon welding to cover the surface of the welded metal and prevent its oxidization. This makes it possible to keep a metallic color on the surface of the welded metal similar to zinc-based alloy coatings, which provides the welded joint with a good appearance.

Meanwhile, since solid wire does not form a solidified slag, it can be applied to TIG arc welding and plasma arc welding as filler wire. The following shows preferable ranges of components/composition to be contained in a solid wire and/or a flux-cored wire.

Carbon (C) is an element for stabilizing the austenite phase. A carbon content of 0.01% or more in the welding wire is preferable to achieve this function. However, if the content of C exceeds 0.05%, it increases the strength of the weld metal and may cause liquid-metal embrittlement cracks at the edge of the welded portion on a zinc-coated steel sheet. Therefore, the C content in the welding wire is preferably 0.05% or less.

Silicon (Si) is an element working as an antioxidant with the weld metal. It is preferable to contain Si in an amount of 0.1% or more in the welding wire to take advantage of this function. However, if the Si content exceeds 1%, it may cause intermetallic compounds in the weld metal, which can deteriorate the toughness. Therefore, the upper limit of the Si content is preferably 1%.

Manganese (Mn) is an element working as an antioxidant with the weld metal and makes sulfur (S) harmless by merging thereto. Sulfur is an unavoidable impurity that can be harmful with hot cracking. It is preferable to contain Mn in an amount of 0.5% or more in the welding wire to take advantage of these functions. However, if the content of Mn exceeds 3%, it may reduce the corrosion resistance of the weld metal. Therefore, the upper limit of the Mn content is preferably 3%.

Nickel (Ni) is an important element for stabilizing the austenite phase of the weld metal and for adjusting the balance between the austenite phase and the ferrite phase. It is preferable to contain Ni in an amount of 7% or more in the welding wire to take advantage of these functions. However, if the content of Ni exceeds 12% it may reduce the toughness of the weld metal. Therefore, the upper limit of the Ni content is preferably 12%.

Chromium (Cr) is a principal element for forming the ferrite phase and for avoiding liquid-metal embrittlement cracks in the weld metal. It is preferable to contain Cr in an amount of 24% or more in welding wire to fully take advantage of the above functions. However, if the content of Cr in the wire exceeds 30%, it may form intermetallic compounds in the weld metal and deteriorate the toughness. Therefore, the upper limit of the Cr content is preferably 30%.

Molybdenum (Mo) is an element for improving corrosion resistance of the weld metal. However, an excess amount of Mo increases the strength of the weld metal and can cause liquid-metal embrittlement cracks. For example, if the Mo content in the welding wire exceeds 2%, liquid-metal embrittlement cracks may be formed. Therefore, the upper limit of the Mo content is preferably 2%.

Nitrogen (N) is an element capable of stabilizing the austenite of the weld metal to improve corrosion resistance. However, increasing the N content increases the strength of the weld metal, which can cause liquid-metal embrittlement cracks. For example, if the N content in welding wire exceeds 0.17%, liquid-metal embrittlement cracks may be formed. Therefore, the upper limit of the N content is preferably 0.17%.

As for flux-cored wire, the ranges of slag components/composition should preferably be defined as below.

Titanium dioxide ($TiO_2$) forms dense and easy-peelable slag to stabilize the arc. However, a $TiO_2$ content of 0.5% or less does not work satisfactorily and a $TiO_2$ content of 2.5% or more causes lowering of the fluidity of the slag, which forms a bumpy surface of the welded portion with a poor appearance. Therefore the limit of the $TiO_2$ content ranges preferably from 0.5 to 2.5%. As raw materials, the following can be used alone or in combination: rutile, titan slag, iluminite and titanate, such as potassium titanate, and sodium titanate.

Silicon dioxide ($SiO_2$) is a necessary component to form an encapsulated slag. However, if the $SiO_2$ content is less than 1.5%, the encapsulation cannot reach a sufficient level, which lowers function of anti-oxidization for weld metal and does not provide a good appearance. If the $SiO_2$ content exceeds 3.5%, the slag tends to burn dry, peelability worsens and the weld slag increases. Therefore, the limit of the $SiO_2$ content preferably ranges from 1.5 to 3.5%. As for raw materials for $SiO_2$, silica sand, silica, wollastonite, zircon sand and potassium feldspar may be used.

Zirconium dioxide ($ZrO_2$) provides the slag with fluidity. However, if the $ZrO_2$ content is less than 0.5%, the fluidity becomes insufficient. If the $ZrO_2$ content is more than 2.5%, the slag becomes stiff, peelability worsens and the weld slag increases. Therefore, the limit of the $SiO_2$ content preferably ranges from 0.5 to 2.5%. As for raw materials, zirconium oxide, zirconium flower, and Zilcon sand may be used.

If the content of total slag components in the flux is less than 6.5%, the slag encapsulation is not sufficient. If the content of total slag components in the flux is more than 9.5%, the weld slag increases and it become easy to have slag inclusions. Therefore, the total of the slag components in the flux preferably ranges from 6.5 to 9.5%.

The present invention is applicable to coated steel sheets such as zinc coated steel sheets, Zn—Al-based alloy coated steel sheets, Zn—Al—Mg-based alloy coated steel sheets and Zn—Al—Mg—Si-based alloy coated steel sheets. The coating amount is preferably 50 g/m$^2$ or more per surface in terms of securing corrosion resistance and 150 g/m$^2$ or less per surface in terms of welding workability.

In order to make more highly corrosion free weld joints, sheets with greater corrosion resistance, for instance, Zn—Al—Mg—Si-based alloy coated steel sheets, should preferably be used. In such sheets, the Al content is 2-19%, the Mg content is 1-10%, the Si content is 0.01-2% and the balance is Zn.

In the present invention, low-alloy structural steels are mainly used as a basic material for zinc-based alloy coated steel sheets. However, it is not necessary to define the components/composition of the basic material of such zinc-based alloy coated steel sheets unless the components/composition of the welding material is diluted during welding to be outside of ranges defined by the present invention. In this meaning, the present invention can be applied to a weld joint between different materials, such as welding a zinc-based coated steel sheet and a stainless-steel-based steel sheet.

The present invention can be applied to any shape of weld joint, for example, a fillet joint, a lap fillet joint or a butt joint. As described above, liquid-metal embrittlement cracking occurs particularly when a binding force is applied to the welded portion. Therefore, it is more meaningful to apply the present invention to a Fillet weld joint made by Fillet welding of a zinc-based alloy coated steel sheet having a thickness of 3 mm or more where the binding force is very strong.

As for welding the method, any of MIG arc welding, MAG arc welding and carbon dioxide gas arc welding can be used. As for the welding conditions, there are no specific limited conditions. However, melting the basic material of the steel sheet can change the components/composition of the weld metal. Therefore, it is preferable to avoid unnecessary increase in dilution by the melted basic material according to the following conditions: input heat is preferably 10 KJ/cm or less, and dilution ratio of the basic material is preferably 10-40%. The dilution ratio of the basic material is defined as follows:

$$\text{dilution ratio of basic material} = (\text{each melted component of the basic material}) / (\text{each melted component of the basic material} + \text{each melted component of the welding material}) \times 100\% \quad (1)$$

The input heat for welding can be controlled to preferably be 10 KJ/cm or less, by adjusting the welding current, the welding voltage and the welding speed.

The present invention can be applied to tailor blank welding, other than arc welding, by using stainless steel-based welding wire as filler wire.

EXAMPLES

The welding material used is solid wire containing alloy components is designated in Table 1 below as (S1), (S2), S(11), and S(12) and flux-cored wire is designated as (F3)-(F10).

The flux-cored wire contains the following slag components: $TiO_2$: 1.7%, $SiO_2$: 2.5% and $ZrO_2$: 1.6% per total wire weight. (S12) is welding wire for ordinary steel.

Table 2 shows the components/composition of zinc-based alloy steel sheets to be used and the coating weights. Coated steel sheet A is a zinc alloy coated steel sheet, class 590 MPa, 6 mm in thickness. Coated steel sheet B is a Zn—Al—Mg—Si alloy coated steel sheet, class 400 MPa, 3 mm in thickness.

Figure 4:
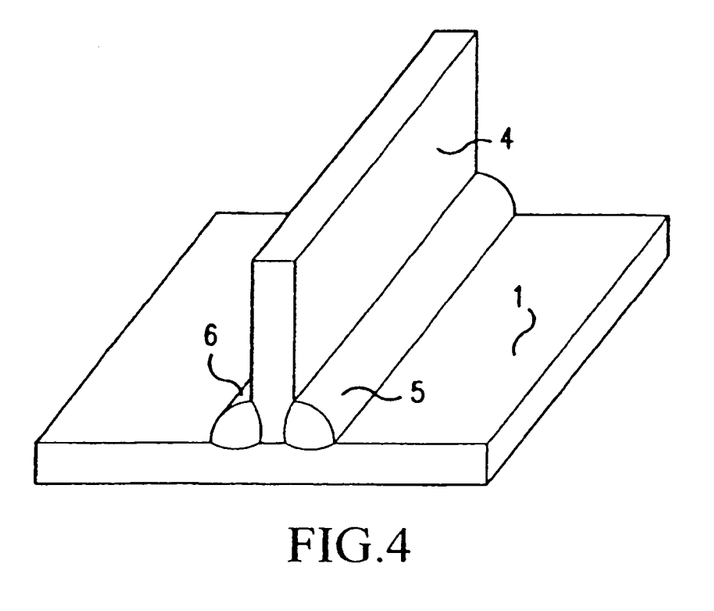
FIG. 4 shows a fillet weld joint test sample

The fillet weld joint shown in FIG. 4 is prepared using the welding material and zinc-based alloy coated steel sheet described above. The joint is evaluated for liquid-metal embrittlement cracks and corrosion resistance of the stainless-steel-based weld metal.

The test sample shown in FIG. 4 is prepared as follows. A zinc-based alloy coated steel sheet 4 is vertically placed on a horizontally set zinc-based alloy coated steel sheet 1. Then a fillet welding 5 is carried on using a stainless-steel based wire. After the welded portion is cooled off; a fillet welding 6 is performed to complete the test sample. Fillet welds 5 and 6 have similar penetration shape, which indicates that dilution ratios of basic material at Fillet welds 5 and 6 are substantially similar.

The welding conditions of fillet weld 5 is welding current: 200-220 A, arc voltage: 25-28V, welding speed: 40-50 cm/min., shield gas: in the case of using solid wire, a mixed gas of (argon+2% oxygen) is used, in the case of using flux-cored wire, a mixed gas of (argon+20-50% carbon dioxide) is used, or in the case of using flux-cored wire, carbon dioxide gas is used. Under these welding conditions, the dilution ratio of the basic material during welding is roughly determined by the kind of shield gas. When using (argon+2% oxygen) as a shielding gas, the dilution ratio of basic material is about 15%. When using (argon+20-50% carbon dioxide), the dilution ratio ranges from 20 to 35% as the carbon dioxide gas ratio in the mixed gas changes from 20 to 50%.

Evaluation of liquid-metal embrittlement cracks of the weld metals is performed with a color check (liquid penetrant inspection method). If a crack is not observed with the naked eye, the evaluation is "good".

Evaluation of corrosion resistance is performed with a JASO-defined mixed cycle corrosion test. One cycle of the test is as follows. (1) salt-water (5% NaCl) spray, 35° C., 2 hours; (2)-drying (moisture 30%), 60° C., 4 hours, and (3) wet condition (moisture 95%), 50° C., 2 hours. A total of 120 cycles are performed and red rust is checked every 20 cycles. If red rust is not observed in the first 20 cycles, the evaluation of corrosion is "good".

Table 3 shows the components/composition, the Cr equivalent and Ni equivalent, the relation to expression (1), and evaluations of liquid-metal embrittlement cracks and corrosion resistance of each weld metal test sample.

With respect to sample Nos. 1-8, these meet the upper and lower limits of Ni equivalent. No liquid-metal embrittlement cracks are observed and the corrosion resistance is good. Sample Nos. 1-2 using solid wire have weld spatters, but sample Nos. 3-8 using flux-cored wire have little weld spatter and good weldability.

Sample No. 7 is the sample to which Mo and N added. Red rust is observed in the area around the welded metal at 40 cycles but no red rust is observed on the welded metal itself until more than 120 cycles. Samples No. 3 and No. 8 are the samples to which the high corrosion resistant coating Zn—Al—Mg—Si alloy is applied. These samples show excellent corrosion resistance including both the welded portion and the area in the vicinity of the weld.

Sample Nos. 9-15 are comparison examples that are out of the range defined by the present invention. None of sample Nos. 9-12 meets the right part of expression (1) (upper limit of Ni equivalent), and all show brittleness cracks. Sample No. 11 has an excess amount of Mo and N.

Sample Nos. 9-12 meet the condition: $-0.7 \times$ Cr equivalent$+ 20 \leqq$ N equivalent (lower limit of Ni) disclosed in JP09-267177A, but do not meet upper limit of Ni defined by the present invention. Therefore, these samples do not form sufficient amounts of ferrite phase in the welded metal, and thus form brittleness cracks.

Sample No. 13 does not meet left part of expression (1) (Ni lower limit), and brittleness crack is observed. Sample Nos. 4, 5 and 13 use the same welding wire. However, sample No. 13, where carbon dioxide is used as a shielding gas, has an increased penetration at the welded portion, which causes an increase of dilution of the basic material, and thus, the final components/composition of the welded metal fall out of the range defined by the present invention.

Sample Nos. 14 and 15 use a welding wire for ordinary steel. Needless to say, the weld metal is lacking in Cr and Ni. Therefore, the corrosion resistance is poor and red rust forms at an early stage. This weld metal has ferrite rich welding components of soft steel. Thus, although the conditions of the present invention are not met, brittleness cracks do not occur.

Sample Nos. 3-11 and sample No. 13 use flux-cored wire as a welding material. In these samples, solidified slag from welding covers the surface of the welded metal to inhibit oxidization, which enables maintenance of a metallic luster.

TABLE 1

| Welding Material | alloy components (metal component % per wire total mass) | | | | | | | slag components (slag component % per wire total mass) | | | Remarks |
|---|---|---|---|---|---|---|---|---|---|---|---|
| | C | Si | Mn | Ni | Cr | Mo | N | $TiO_2$ | $SiO_2$ | $ZrO_2$ | |
| (S1) | 0.01 | 0.3 | 1.5 | 8.6 | 26.8 | 0 | 0.007 | — | — | — | Solid wire |
| (S2) | 0.01 | 0.2 | 1.7 | 7.2 | 28.5 | 0 | 0.006 | — | — | — | Solid wire |
| (F3) | 0.02 | 0.4 | 1.3 | 8.6 | 267 | 0 | 0.015 | 1.7 | 2.5 | 1.6 | flux-cored wire |
| (F4) | 0.01 | 0.3 | 1.5 | 8.6 | 249 | 0 | 0.015 | 1.7 | 2.5 | 1.6 | flux-cored wire |
| (F5) | 0.02 | 0.3 | 1.6 | 8.6 | 325 | 0 | 0.016 | 1.7 | 2.5 | 1.6 | flux-cored wire |
| (F6) | 0.02 | 0.2 | 1.6 | 8.5 | 281 | 1.7 | 0.15 | 1.7 | 2.5 | 1.6 | flux-cored wire |
| (F7) | 0.01 | 0.2 | 2.1 | 10.2 | 292 | 0 | 0.015 | 1.7 | 2.5 | 1.6 | flux-cored wire |
| (F8) | 0.01 | 0.2 | 1.5 | 11.2 | 201 | 0 | 0.02 | 1.7 | 2.5 | 1.6 | flux-cored wire |
| (F9) | 0.02 | 0.3 | 1.5 | 12.2 | 243 | 0 | 0.02 | 1.7 | 2.5 | 1.6 | flux-cored wire |
| (F10) | 0.01 | 0.2 | 1.5 | 9.8 | 242 | 3.1 | 0.2 | 1.7 | 2.5 | 1.6 | flux-cored wire |
| (S11) | 0.01 | 0.2 | 2.1 | 12.2 | 242 | 0 | 0.007 | — | — | — | Solid wire |
| (S12) | 0.07 | 0.6 | 1.8 | 0 | 0 | 0 | 0.007 | — | — | — | Solid wire |

TABLE 2

| Coated Steel Sheet | Basic material components (mass %) | | | Coating components (mass) % | | | Coating weight per surface (g/m²) |
|---|---|---|---|---|---|---|---|
| | C | Si | Mn | Zn | Al | Mg | Si | |
| A | 0.15 | 0.02 | 1.5 | 100.0 | — | — | — | 130 |
| B | 0.08 | 0.02 | 1.1 | 85.8 | 11.0 | 3.0 | 0.2 | 90 |

TABLE 3

| No | Coated Steel Sheet | Welding Material | Shield Gas | Weld Metal Components | | | | | | | Ni equiv. Express. (2) | Cr Equiv. Express. (3) |
|---|---|---|---|---|---|---|---|---|---|---|---|---|
| | | | | C | Si | Mn | Ni | Cr | Mo | N | | |
| 1 | A | S1 | Ar + 2% O$_2$ | 0.03 | 0.26 | 1.5 | 7.3 | 22.8 | 0.0 | 0.01 | 9.3 | 23.2 |
| 2 | A | S2 | Ar + 2% O$_2$ | 0.03 | 0.17 | 1.7 | 6.1 | 24.2 | 0.0 | 0.01 | 8.0 | 24.6 |
| 3 | B | F3 | CO$_2$ | 0.04 | 0.29 | 1.2 | 6.0 | 18.7 | 0.0 | 0.02 | 8.4 | 19.1 |
| 4 | A | F4 | 80% Ar + 20% CO$_2$ | 0.04 | 0.24 | 1.5 | 6.9 | 19.9 | 0.0 | 0.02 | 9.4 | 20.3 |
| 5 | A | F4 | 50% Ar + 50% CO$_2$ | 0.05 | 0.23 | 1.5 | 6.5 | 18.7 | 0.0 | 0.02 | 9.2 | 19.0 |
| 6 | A | F5 | CO$_2$ | 0.06 | 0.22 | 1.6 | 6.0 | 22.8 | 0.0 | 0.02 | 9.3 | 23.1 |
| 7 | A | F6 | CO$_2$ | 0.06 | 0.15 | 1.6 | 6.0 | 19.7 | 1.2 | 0.11 | 11.8 | 21.1 |
| 8 | B | F7 | CO$_2$ | 0.03 | 0.15 | 1.8 | 7.4 | 21.3 | 0.0 | 0.01 | 9.6 | 21.5 |
| 9 | B | F8 | CO$_2$ | 0.02 | 0.16 | 1.4 | 9.0 | 16.1 | 0.0 | 0.02 | 10.9 | 16.3 |
| 10 | A | F9 | 80% Ar + 20% CO$_2$ | 0.04 | 0.26 | 1.5 | 10.4 | 20.7 | 0.0 | 0.02 | 12.8 | 21.0 |
| 11 | A | F10 | CO$_2$ | 0.05 | 0.15 | 1.5 | 6.9 | 17.2 | 2.2 | 0.17 | 14.3 | 19.6 |
| 12 | A | S11 | Ar + 2% O$_2$ | 0.05 | 0.15 | 1.9 | 8.5 | 16.9 | 0.0 | 0.01 | 11.4 | 17.2 |
| 13 | B | F4 | CO$_2$ | 0.03 | 0.22 | 1.4 | 6.0 | 17.4 | 0.0 | 0.02 | 8.2 | 17.8 |
| 14 | A | S12 | CO$_2$ | 0.09 | 0.43 | 1.7 | 0.0 | 0.0 | 0.0 | 0.02 | 4.3 | 0.6 |
| 15 | B | S12 | 80% Ar + 20% CO$_2$ | 0.07 | 0.46 | 1.6 | 0.0 | 0.0 | 0.0 | 0.02 | 3.6 | 0.7 |

| No | Ni Upper limit Right Part of (1) | Ni Lower limit Left Part of (1) | Brittleness Crack | Corrosion Resistance (Time of red rust observed) | Appearance | |
|---|---|---|---|---|---|---|
| 1 | 13.9 | 4.4 | No crack | Good (40 cycle) | Oxidized Black | INVENTION |
| 2 | 15.2 | 3.4 | No crack | Good (40 cycle) | Oxidized Black | |
| 3 | 10.1 | 7.7 | No crack | Good (120 cycle more) | Metallic luster | |
| 4 | 11.2 | 6.8 | No crack | Good (40 cycle) | Metallic luster | |
| 5 | 10.0 | 7.8 | No crack | Good (40 cycle) | Metallic luster | |
| 6 | 13.8 | 4.5 | No crack | Good (40 cycle) | Metallic luster | |
| 7 | 11.9 | 6.1 | No crack | Good (40 cycle) | Metallic luster | |
| 8 | 12.4 | 5.8 | No crack | Good (120 cycle more) | Metallic luster | |
| 9 | 7.4 | 10.0 | Crack | Good (120 cycle more) | Metallic luster | COMPRISON |
| 10 | 11.9 | 6.2 | Crack | Good (40 cycle) | Metallic luster | |
| 11 | 10.5 | 7.3 | Crack | Good (40 cycle) | Metallic luster | |
| 12 | 8.2 | 9.3 | Crack | Good (40 cycle) | Oxidized Black | |
| 13 | 8.8 | 8.8 | Crack | Good (120 cycle more) | Metallic luster | |
| 14 | −7.5 | 22.7 | No crack | Not good (less 5 cycle) | Oxidized Black | |
| 15 | −7.5 | 22.6 | No crack | Not good (less 5 cycle) | Oxidized Black | |

All cited patents, publications, copending applications, and provisional applications referred to in this application are herein incorporated by reference.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A weld joint comprising:
a first zinc-based alloy coated steel sheet;
a second zinc-based alloy coated steel sheet; and
a weld portion joining said first zinc-based alloy coated steel sheet and said second zinc-based alloy coated steel sheet,
wherein said weld portion contains in mass percent (%):
C: 0.01-0.1;
Si: 0.1-1;
Mn: 0.5-2.5;
Ni: 5-11; and
Cr: 17-25,
and the balance being iron and residual impurities,
wherein the following expressions (1), (2) and (3) are met;

$$-0.81 \times \text{Cr equivalent} + 23.2 \leq \text{Ni equivalent} \leq 0.95 \times \text{Cr equivalent} - 8.1 \quad (1)$$

$$\text{Ni equivalent} = \text{Ni} + 30 \times \text{C} + 0.5 \times \text{Mn} + 30 \times \text{N} \quad (2)$$

$$\text{Cr equivalent} = \text{Cr} + \text{Mo} + 1.5 \times \text{Si} \quad (3)$$

wherein each of Ni, C, Mn, N, Cr, Mo and Si represents content (mass %) of each component element contained in the stainless steel-based weld metal.

2. The weld joint according to claim 1, wherein the stainless steel-based weld metal further comprises in mass (%):
Mo: 0.5-2; and
N: 0.05-0.15,
wherein each of Mo and N represents content (mass %) of each component element contained in the stainless steel-based weld metal.

3. The weld joint according to claim 1, wherein each of the first and second zinc-based alloy coated steel sheet comprises a zinc-based alloy coating containing in mass (%) with the balance being zinc and residual impurities:
Al: 2-19;
Mg: 1-10; and
Si: 0.01-2.

4. The weld joint according to claim 1, wherein a thickness of each of the first and second zinc-based alloy coated steel sheets is 3 mm or more, and
a shape of the weld joint is a fillet weld joint.

* * * * *